US008649285B2

(12) United States Patent
Fuchs et al.

(10) Patent No.: US 8,649,285 B2
(45) Date of Patent: Feb. 11, 2014

(54) TRACKING PACKET SEQUENCE NUMBERS (75) Inventors: Brian Fuchs, Thousand Oaks, CA (US); Gerald Pepper, Thousand Oaks, CA (US); Sanjay Cartic, Malibu, CA (US)

(73) Assignee: Ixia, Calabasas, CA (US)

( * ) Notice: Subject to any disclaimer, the term of this patent is extended or adjusted under 35 U.S.C. 154(b) by 274 days.

(21) Appl. No.: 13/005,467

(22) Filed: Jan. 12, 2011

(65) Prior Publication Data

US 2012/0176920 A1 Jul. 12, 2012

(51) Int. Cl.
*H04L 12/26* (2006.01)

(52) U.S. Cl.
USPC ........... 370/252; 370/230; 370/245; 370/394; 379/26.01; 379/27.03

(58) Field of Classification Search
USPC ................. 370/230, 235, 242–245, 394, 252; 379/26.01–27.03
See application file for complete search history.

(56) References Cited

U.S. PATENT DOCUMENTS

| 5,343,463 | A | 8/1994 | van Tetering et al. |
| 5,477,531 | A | 12/1995 | McKee |
| 5,600,632 | A | 2/1997 | Schulman |
| 6,028,847 | A | 2/2000 | Beanland |
| 6,172,989 | B1 | 1/2001 | Yanagihara |
| 6,233,256 | B1 | 5/2001 | Dieterich et al. |
| 6,252,891 | B1 | 6/2001 | Perches |
| 6,360,332 | B1 | 3/2002 | Weinberg |
| 6,545,979 | B1 | 4/2003 | Poulin |
| 6,601,098 | B1 | 7/2003 | Case et al. |
| 6,717,917 | B1 | 4/2004 | Weissberger et al. |
| 6,728,929 | B1 | 4/2004 | Luong |
| 6,950,405 | B2 | 9/2005 | Van Gerrevink |
| 7,123,616 | B2 | 10/2006 | Weissberger et al. |
| 7,313,141 | B2 | 12/2007 | Kan et al. |
| 7,417,991 | B1 | 8/2008 | Crawford et al. |
| 7,489,706 | B2 | 2/2009 | Hatley |
| 7,594,159 | B2 | 9/2009 | Fujikami et al. |

(Continued)

FOREIGN PATENT DOCUMENTS

EP 1111871 6/2001

OTHER PUBLICATIONS

European Patent Office, European Search Report, European Patent Office, European Search Report for European Application No. 11009481.0, mail date Feb. 7, 2012, pp. 1-12.

*Primary Examiner* — Charles C Jiang
*Assistant Examiner* — Mohamed Kamara
(74) *Attorney, Agent, or Firm* — SoCal IP Law Group LLP; John E. Gunther; Steven C. Sereboff (57) ABSTRACT

Methods, traffic receivers, and computer readable storage media for testing network connections are disclosed. A traffic receiver coupled to a network under test may receive a packet. A packet group identification number (PGID and a sequence number (SN) may be extracted from the received packet. Data associated with the PGID may be retrieved from a memory, the data including a next expected sequence number (NESN), a start of run (SOR), a number of in-order packets (NIO) and a number of duplicate packets (NDP). When SN is equal to NESN, NESN and NIO may be incremented. When SN is less than NESN and SN is greater than or equal to SOR, NDP may be incremented. When SN is greater than NESN, SOR may be set to SN, NESN may be set to SN plus one, and NIO maybe incremented. Updated data may be stored in the memory.

16 Claims, 6 Drawing Sheets

(56) References Cited

U.S. PATENT DOCUMENTS

| | | |
|---|---|---|
| 2001/0050901 A1 | 12/2001 | Love et al. |
| 2004/0052259 A1 | 3/2004 | Garcia |
| 2007/0115833 A1 | 5/2007 | Pepper et al. |
| 2007/0263631 A1* | 11/2007 | Mallory ........................ 370/394 |
| 2009/0262743 A1* | 10/2009 | Uyehara et al. ............... 370/394 |
| 2009/0310491 A1 | 12/2009 | Ginsberg |
| 2012/0106330 A1* | 5/2012 | Davidson ...................... 370/230 |

* cited by examiner

TRACKING PACKET SEQUENCE NUMBERS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to receiving and processing traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, and layer 4 of the structure are the physical layer, the data link layer, the network layer, and the transport layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

For the purpose of reporting network traffic data, the test traffic may be organized into packet groups, where a "packet group" is any plurality of packets for which network traffic statistics are reported. The packets constituting a packet group may be identified by a packet group identification number (PGID) embedded in the payload of each packet. The packets constituting a packet group may be sequentially numbered in the order of transmission, and the corresponding sequence number may also be embedded in the payload of each packet. The sequential sequence numbers may be used to track how often a network delivers packets in the same order that the packets were transmitted.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
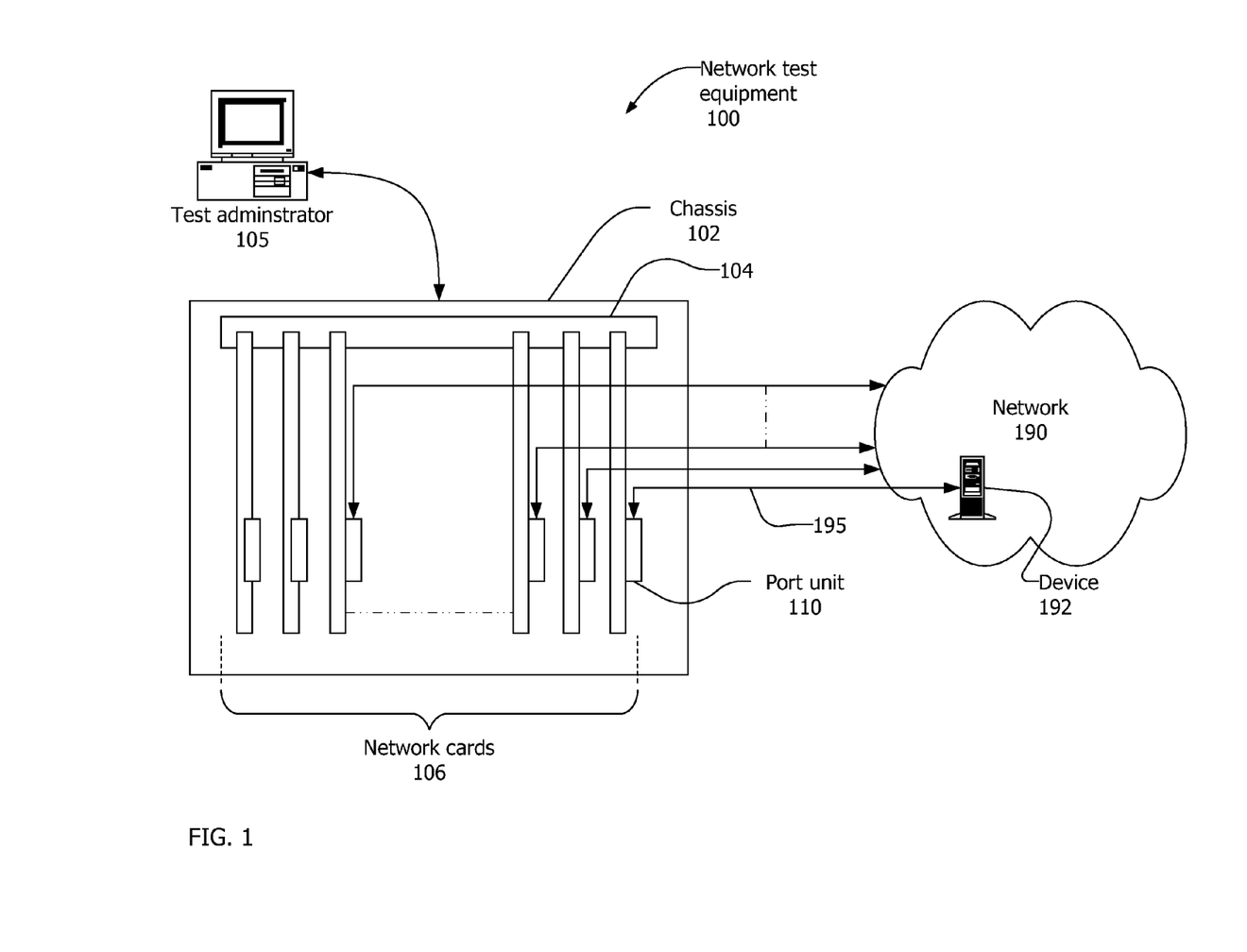
FIG. 1 is a block diagram of a network environment.

FIG. 1 shows a block diagram of a network environment. The environment may include network test equipment 100, a network 190 and plural network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may contain one or more port unit 110. Each port unit 110 may connect to the network 190 through one or more ports. Each port unit 110 may be connected to the network 190 through a communication medium 195, which may be a wire, an optical fiber, a wireless link, or other communication medium. Each network card 106 may support a single communications protocol, may support a number of related protocols, or may support a number of unrelated protocols. The network cards 106 may be permanently installed in the network test equipment 100 or may be removable.

The network cards 106 may include processors, memory, logic, and other specialized circuits and devices to perform the functions described herein. In this patent, the term "logic" means digital circuits including combinatorial logic, sequential logic, state machines, and other digital circuits. Logic, processors, and memory may be implemented, in whole or in part, by one or more field programmable gate arrays (FPGAs), application specific integrated circuits (ASICs), programmable logic devices (PLDs), programmable logic arrays (PLAs), processors and other kinds of devices, all of which are called programmable devices herein. In addition, the network cards 106 may include software and/or firmware.

The backplane 104 may serve as a bus or communications medium for the network cards 106. The backplane 104 may also provide power to the network cards 106.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 195. The network itself may be comprised of numerous nodes providing numerous physical and logical paths for data to travel.

Figure 2:
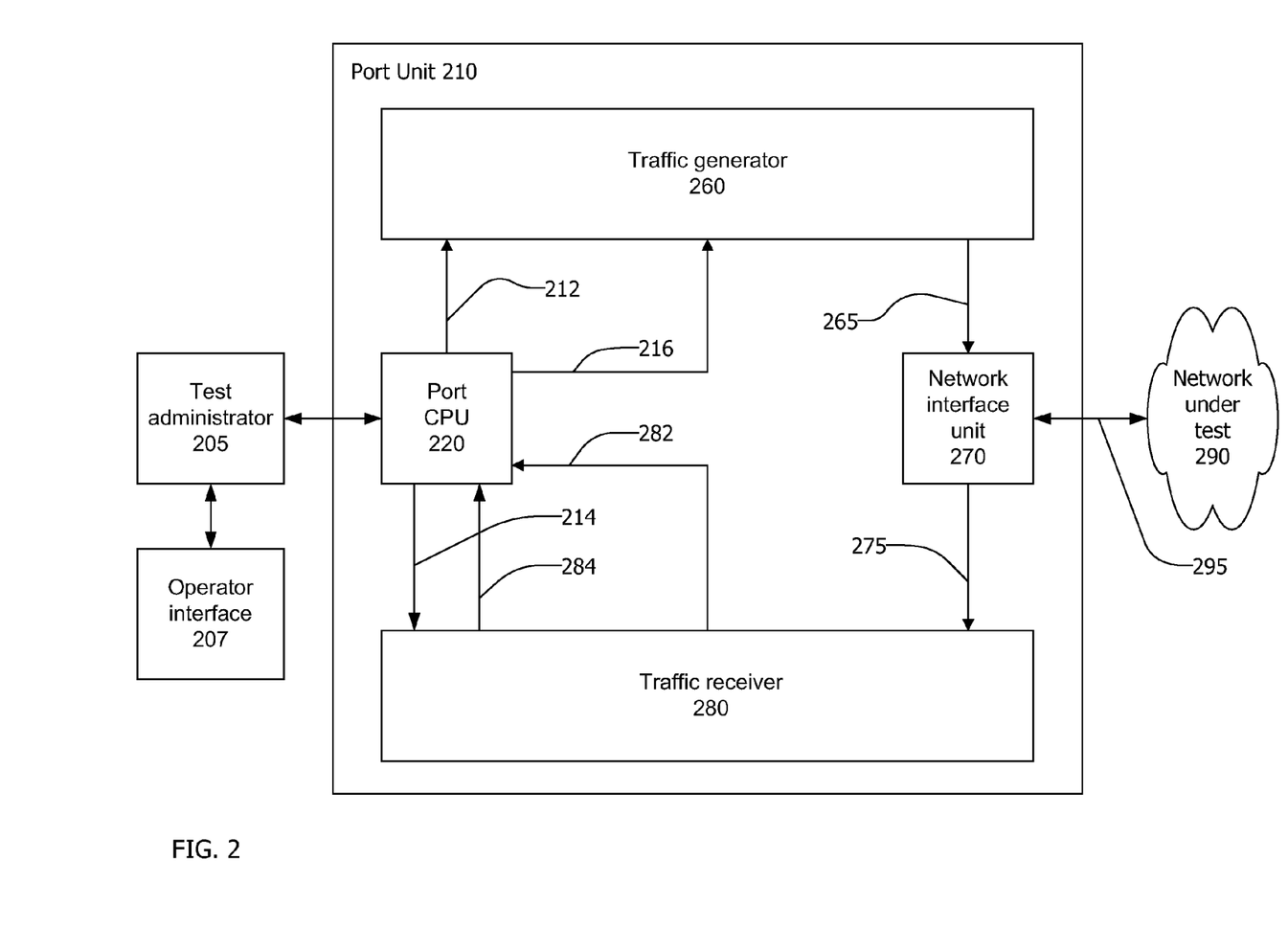
FIG. 2 is a block diagram of a port unit.

Referring now to FIG. 2, an exemplary port unit 210 may include a port central processing unit (CPU) 220, a traffic generator unit 260, a traffic receiver unit 280, and a network interface unit 270 which couples the port unit 210 to a network under test 290. The port unit 210 may be all or part of a network card such as the network cards 106.

The port CPU 220 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 220 may communicate with a test administrator 205. The test administrator 205 may be a computing device contained within, or external to, the network test equipment 100. The test administrator 205 may provide the port CPU 220 with instructions and data required for the port unit to participate in testing the network 290. The instructions and data received from the test administrator 205 may include, for example, definitions of packet streams to be generated by the port unit 210 and definitions of performance statistics that may be accumulated and reported by the port unit 210.

The port CPU 220 may provide the traffic generator unit 260 with stream forming data 212 to form a plurality of streams. The stream forming data 212 may include, for example, the type of packet, the frequency of transmission, definitions of fixed and variable-content fields within the packet and other information for each packet stream. The traffic generator unit 260 may then generate the plurality of streams in accordance with the stream forming data 212. The plurality of streams may be interleaved to form outgoing test traffic 265.

Each of the streams may include a sequence of packets. The packets within each stream may be of the same general type but may vary in length and content. Each stream may be comprised of one or more packets groups of sequentially-numbered packets. Each packet may include a PGID to identify a packet group to which the packet belongs and a sequence number to indicate the relative position of the packet within the packet group.

The network interface unit 270 may convert the outgoing test traffic 265 from the traffic generator unit 260 into an electrical, optical, or wireless signal format required to transmit the test traffic to the network under test 290 via a link 295, which may be a wire, an optical fiber, a wireless link, or other communication link. Similarly, the network interface unit 270 may receive electrical, optical, or wireless signals from the network over the link 295 and may convert the received signals into incoming test traffic 275 in a format usable to the traffic receiver unit 280.

The traffic receiver unit 280 may receive the incoming test traffic 275 from the network interface unit 270. The traffic receiver unit 280 may determine if each received packet is a member of a specific packet group, and may accumulate test statistics for each packet group in accordance with test instructions 214 provided by the port CPU 220. The accumulated test statistics may include, for example, a total number of received packets, a number of packets received in-order, a number of received packets with errors, a maximum, average, and minimum propagation delay, and other statistics for each flow. The traffic receiver unit 280 may also capture and store selected packets in accordance with capture criteria included in the test instructions 214. The traffic receiver unit 280 may provide test statistics and/or captured packets 284 to the port CPU 220, in accordance with the test instructions 214, for additional analysis during, or subsequent to, the test session.

The outgoing test traffic 265 and the incoming test traffic 275 may be primarily stateless, which is to say that a substantial portion of the outgoing test traffic 265 may be generated by the traffic generator 260 without expectation of any response and the incoming test traffic 275 may be received by the traffic receiver 280 without any intention of responding. The transmission and reception of stateless traffic may be sufficient to perform layer 2 and layer 3 testing of the network under test 290. However, to initiate a test session and/or test the layer 4 (or higher layer) performance of a network device such as a server or server load balancer, some stateful communications may be required between the port unit 210 and the network under test 290 during a test session.

For example, to establish and use TCP connections, the port CPU 220 may prepare appropriate TCP packets and provide the TCP packets 216 to the traffic generator 260. The traffic generator 260 may insert the TCP packets into the outgoing test traffic 265. The traffic receiver 280 may separate received TCP packets from received stateless traffic and send the received TCP packets 282 to the port CPU 220 for processing.

Figure 3:
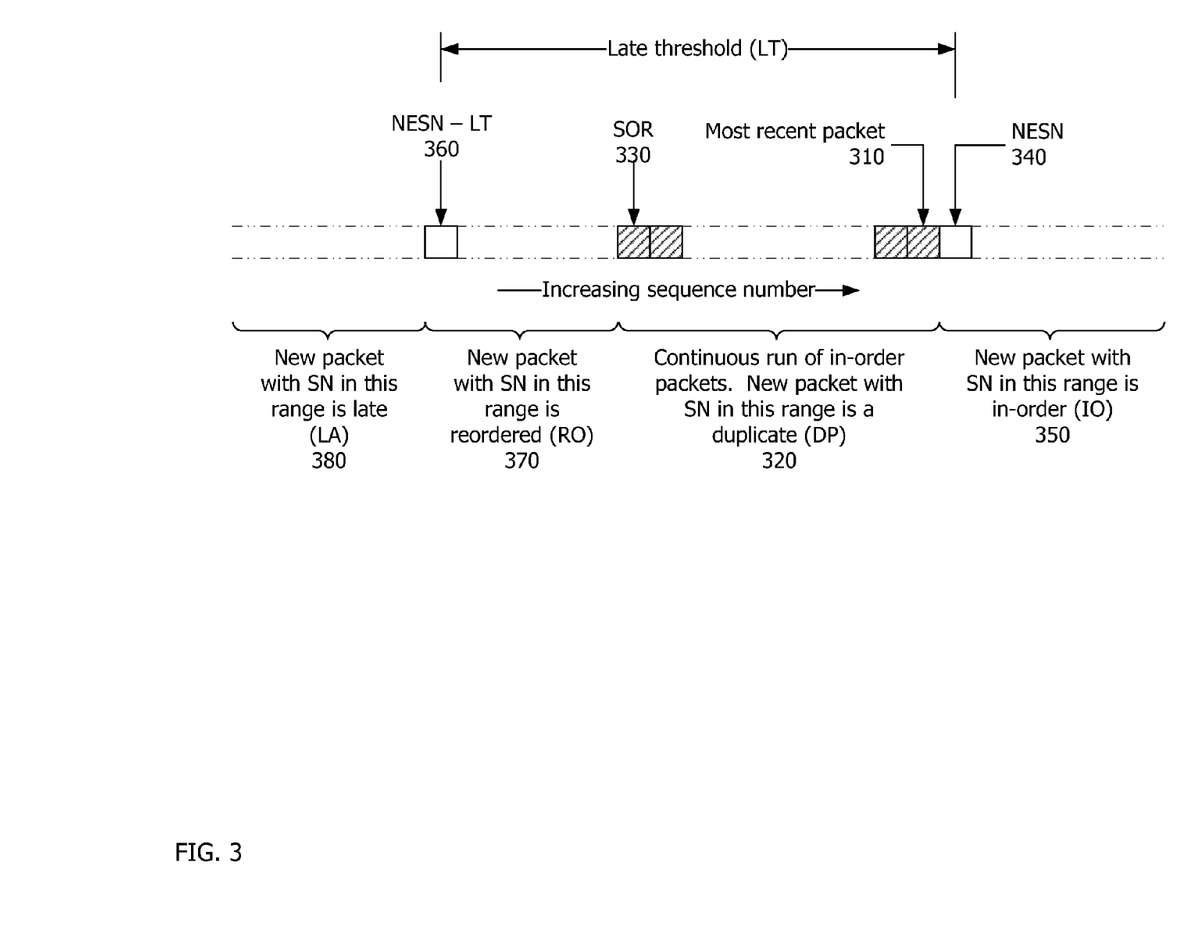
FIG. 3 is a graphical representation of sequentially numbered packets.

FIG. 3 provides a graphical representation of sequence numbers assigned to the packets within a specific packet group. Each square represents the sequence number of a specific packet including a most recent packet 310, which is the packet most recently received at a traffic receiver, which may be the traffic receiver 280, that is a destination of the packet group. The most recent packet 310 may be preceded by a continuous run of in-order packets, which is to say packets having consecutive sequence numbers received in the order that they were transmitted. The sequence number of the first packet in the continuous run of in-order packets 320 is defined as the start of run (SOR) 330.

The packet having the next sequence number after the most recent packet 310 is defined as the next expected sequence number NESN 340. When a next packet in the specific packet group is received by the traffic receiver, the sequence number of the received packet may be compared to NESN to determine if the sequence number is equal to, before, or after NESN. The terms "before" and "after" refer to the order in which packets are transmitted. As will be subsequently discussed with respect to FIG. 6, a sequence number that is after NESN does not necessarily have a higher numerical value than NESN, and a sequence number that is before NESN does not necessarily have a smaller numerical value than NESN.

When the next packet has a sequence number equal to NESN, the received packet is considered to be in-order, and the continuous run of in-order packets 320 is extended.

If the next packet in the specific packet group received at the traffic receiver has a sequence number after NESN, the received packet is considered to be in-order but the continuous run of in-order packets is broken. In this case, the SOR may be set equal to the sequence number of the received packet to start a new continuous run of in-order packets. The sequence numbers between sequence number of the received packet and NESN may be presumed to be lost.

If the sequence number of the next packet in the specific packet group received at the traffic receiver is before NESN and equal to or after SOR, the received packet must be a duplicate of a packet within the continuous run of in-order packets 320. If the sequence number of the received packet is before SOR and equal to or after NESN minus a predetermined late threshold (LT), the received packet is considered to be reordered 370. If the sequence number of the received packet is before NESN minus LT, the received packet is considered to be late 380.

Figure 4:
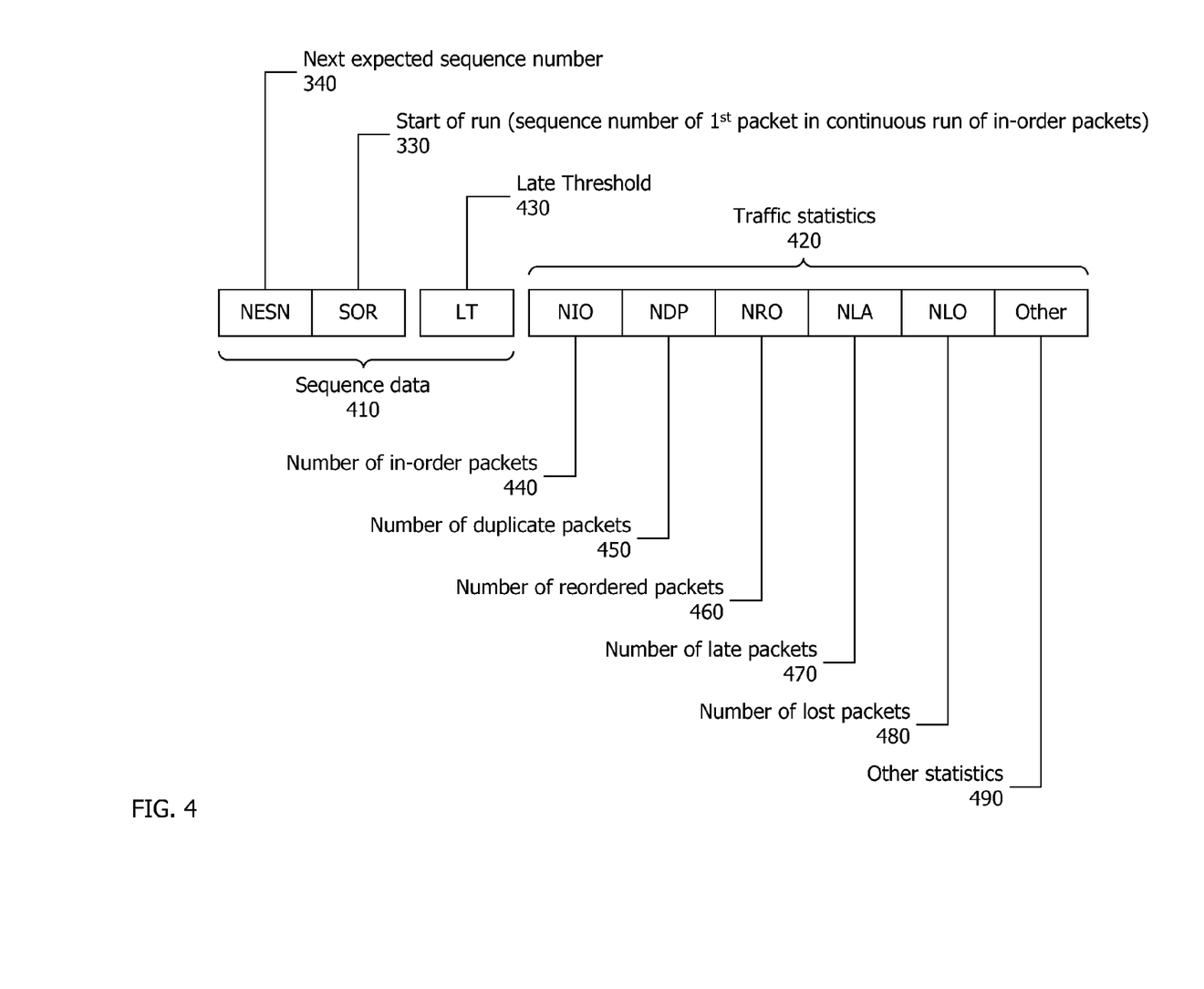
FIG. 4 is a graphical representation of flow statistics.

A traffic receiver may compile and store sequence data and traffic statistics for each packet group. Each time a packet is received by the traffic receiver, the traffic receiver may update the sequence data and traffic statistics for the corresponding packet group. Referring now to FIG. 4, the sequence data 410 stored for each packet group may include a NESN 340 and a SOR 330. The sequence data 410 stored for each packet group may also include a late threshold (LT) 430. Alternatively, the late threshold 430 may be stored as part of the traffic statistics 420, or may be a predetermined value common to all packet groups. The traffic statistics 420 stored for each packet group may include counts of the categories of packets received, as defined in conjunction with FIG. 3. The traffic statistics 420 may include a number of in-order (NIO) packets received 440, a number of duplicate packets (NDP) received 450, a number of reordered packets (NRO) received 460, a number of late (NLA) packets received (470), and a number of lost (NLO) packets 480. The number of lost packets may be based on sequence numbers than were not yet received at the traffic receiver. The traffic statistics 420, may include other statistics 490. The other statistics 490, may include, for example, temporal information such as maximum, minimum, and/or average latency, and other traffic statistics.

The sequence data 410 and the traffic statistics 420 associated with a plurality of packet groups and corresponding PGIDs may be stored in memory within or coupled to the traffic receiver. The memory may include multiple memory devices and may include multiple memory types. For example, some or all of the sequence data may be stored in fast static random access memory and some or all of the traffic statistics may be stored in slower dynamic random access memory. The data represented in FIG. 4 may be organized and stored as desired for a particular system.

Description of Processes

Figure 5:
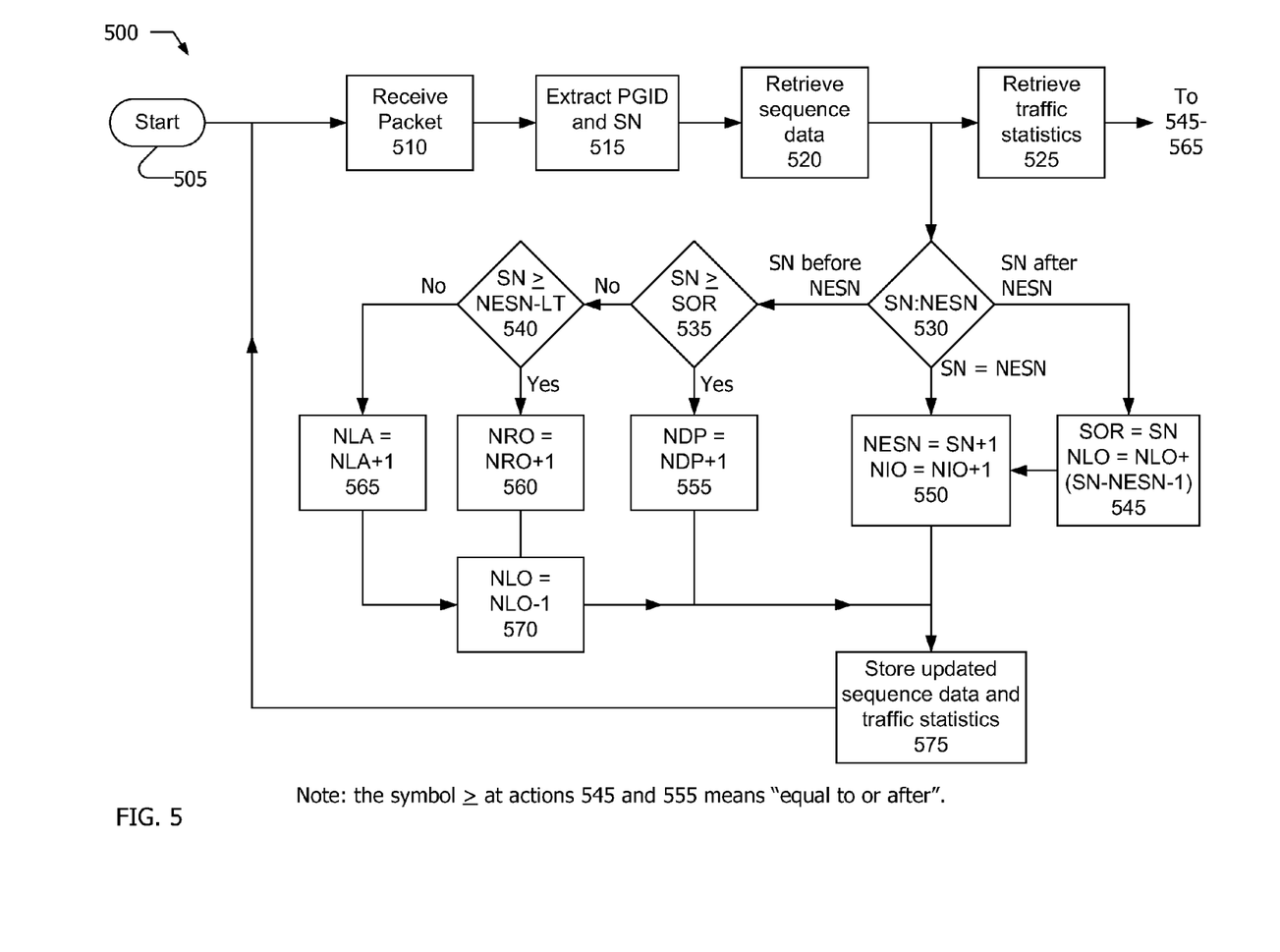
FIG. 5 is a flow chart of a process for tracking packet sequence numbers.

Referring now to FIG. 5, a process 500 for tracking packet sequence numbers may begin at 505 when a test session is initiated and may continue cyclically until a large plurality of packets have been received. The process 500 is cyclic in nature and may be repeated for each received packet. Multiple instances of the process 500 may be executed concurrently at a plurality of port units during a network test session. While the process 500 is shown in FIG. 5 as a flow chart of sequential actions for ease of description, the process 500 may be performed by dedicated hardware such that all or portions of the process 500 are performed essentially simultaneously.

At 510 a packet may be received at a traffic receiver within a port unit, which may be the traffic receiver 280 and the port unit 210, coupled to a network under test. At 515, a packet group identification number (PGID) and a sequence number (SN) may be extracted from the received packet. At 520, sequence data associated with the packet group identified by the PGID may be retrieved from a memory within or coupled to the traffic receiver. The retrieved sequence may include a next expected sequence number (NESN) and a start of run (SOR). A late threshold (LT) may also be retrieved at 520.

At 525, traffic statistics associated with the packet group identified by the PGID extracted at 515 may be retrieved from a memory, which may be the same memory or a different memory from the memory storing the sequence data. The retrieved traffic statistics may include some or all of a number of in-order packets received (NIO), a number of reordered packets received (NRO), a number of duplicate packets received (NDP), a number of late packets received (NLA), and a number of lost packets (NLO), as defined in conjunction with FIG. 3 and FIG. 4.

At 530, SN extracted from the received packet at 515 may be compared to NESN retrieved from memory at 520, and a determination may be made if SN is equal to, before, or after NESN. When SN is equal to NESN, the received packet is the next packet in the current run of continuous in-order packets. In this case, NESN may be set to SN+1 and the value of NIO may be incremented at 550. The updated sequence data and traffic statistics may be stored back into the memory at 575 and the process 500 may be repeated from 510.

When SN is after NESN, the received packet is considered to be in-order, but the previous run of continuous in-order packets is broken. In this case, SOR may set equal to SN and NLO may be increased by the number of missing packets (SN−NESN−1) at 545. The process 500 may then continue at 550, where the value of NESN may be set to SN+1 and the value of NIO may be incremented. The updated sequence data and traffic statistics may be stored back into the memory at 575 and the process 500 may be repeated from 510.

When SN is before NESN, a determination may be made at 535 if SN is equal to or after SOR. If SN is equal to or after SOR, the received packet is a duplicate of a packet within the previous run of continuous in-order packets. In this case, NDP may be incremented at 555. The updated sequence data and traffic statistics may be stored back into the memory at 575 and the process 500 may be repeated from 510.

When a determination is made at 535 than SN is before SOR, a further determination may be made at 540 if SN is equal to or after NESN minus the late threshold LT. When SN is equal to or after NESN−LT, the received packet may be considered to be reordered and NRO may be incremented at 560. When SN is before NESN−LT, the received packet may be considered as late and NLA may be incremented at 565. In either case, a presumption may be made that the received packet is a packet previously considered to be lost and NLO may be decremented at 570. The updated sequence data and traffic statistics may then be stored at 575 and the process 500 may be repeated from 510.

The length of the sequence number included in each received packet may be limited to a finite number of bits, such as 16 bits or 24 bits or some other number of bits. During a long test session, the number of packets transmitted in a packet group may exceed the number that can be expressed within the finite length of the sequence number. In this case, the sequence numbers may wrap, which is to say that the sequence numbers may count up to the maximum value of 11 . . . 11 and then continue starting at 00 . . . 00. For example, if NESN has a value of 00 . . . 01, a new packet having a sequence number of 11 . . . 11 may be before NESN in spite of having a much larger numerical value.

Figure 6:
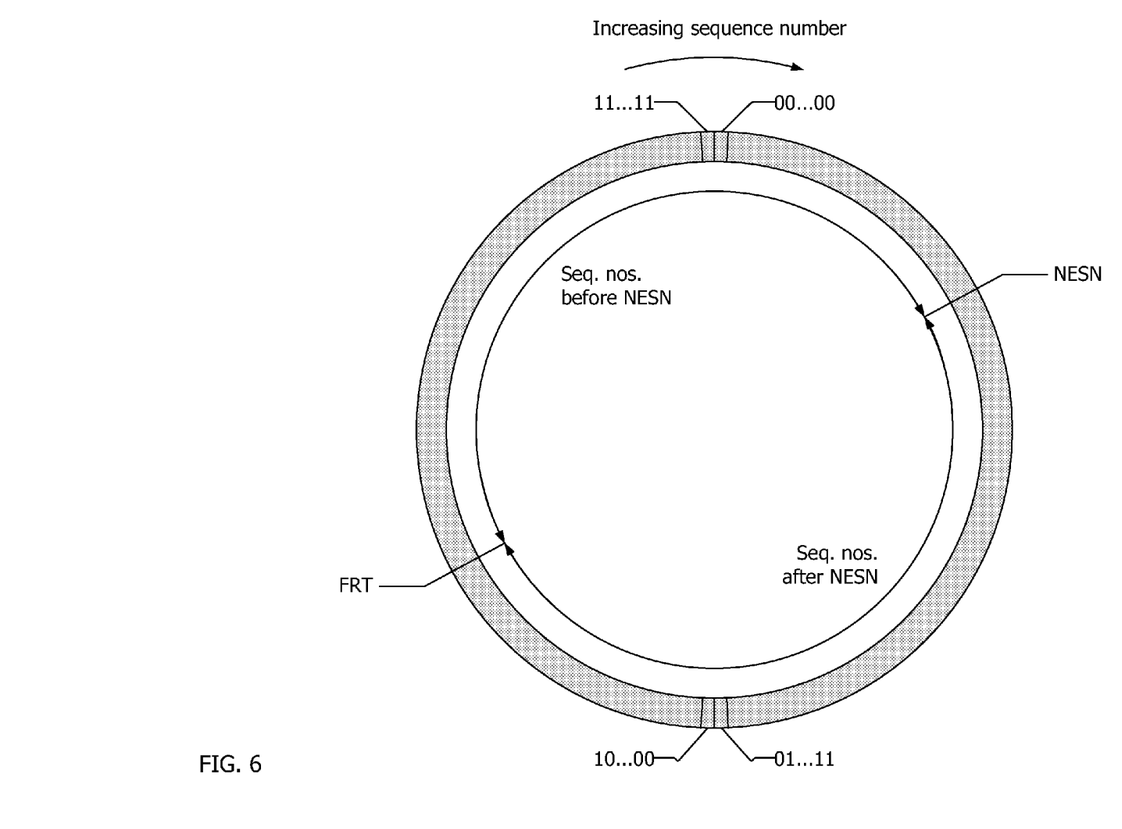
FIG. 6 is a graphical representation of sequence numbers.

FIG. 6 is a graphical representation of sequence numbers as a circle on which sequence numbers increase in a clockwise direction. Consecutive sequence numbers wrap from 11 . . . 11 to 00 . . . 000 at the top of the circle as shown in FIG. 4. NESN is shown at an arbitrary position on the circle. Diametrically opposed to NESN is a forward/reverse threshold (FRT), which may be derived by inverting the most significant bit of NESN. Sequence numbers in a 180-degree arc clockwise from NESN may be considered to be after NESN, and sequence numbers in a 180-degree arc counter-clockwise from NESN may be considered to be before NESN.

The logic that performs the comparisons at 530, 535, and 540 in the process 500 of FIG. 5 may account for the wrapping of sequence numbers when determining if a sequence number is before or after NESN. One possible algorithm to determine if a sequence number (not equal to NESN) is before or after NESN is as follows:

if NESN falls in the range from 00 . . . 000 to 01 . . . 111, then sequence numbers greater than NESN and less than FRT are after NESN; other sequence numbers are before NESN;

if NESN falls in the range from 10 . . . 000 to 11 . . . 111, then sequence numbers greater than FRT and less than NESN are before NESN; other sequence numbers are after NESN.

Other algorithms for determining if a sequence number is before or after NESN may be used.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method performed by a traffic receiver coupled to a network under test, comprising:
  receiving a stream of packets via the network under test, two or more packets from the stream of packets containing a first packet group identification number (PGID); and
  for each of the two or more packets containing the first PGID:
    extracting a sequence number (SN) from the received packet;
    retrieving data associated with the first PGID from memory within or coupled to the traffic receiver, the data including a next expected sequence number (NESN), a start of run (SOR), a number of in-order packets (NIO) and a number of duplicate packets (NDP);
    updating the data, updating the data comprising:
      comparing SN to NESN to determine if SN is equal to, less than, or greater than NESN,
      when SN is equal to NESN, incrementing NESN and incrementing NIO,
      when SN is less than NESN, comparing SN to SOR and, when SN is greater than or equal to SOR, incrementing NDP, and
      when SN is greater than NESN, setting SOR to SN, setting NESN to SN plus one, and incrementing NIO; and
    storing the updated data in the memory.

2. The method of claim 1, wherein the data associated with the first PGID includes a number of lost packets (NLO), updating the data further comprising:
  when SN is greater than NESN, increasing NLO by a value equal to SN minus NESN.

3. The method of claim 2, wherein the data associated with the first PGID includes a number of reordered packets (NRO) and a number of late packets (NLA), updating the data further comprising:
  when SN is less than NESN and SN is less than SOR:
    comparing SN to NESN minus a predetermined late threshold (LT),
    when SN is greater than or equal to NESN minus LT, incrementing NRO and decrementing NLO, and
    when SN is less than NESN minus LT, incrementing NLA and decrementing NLO.

4. The method of claim 3, wherein the data associated with the first PGID includes LT.

5. A traffic receiver comprising:
  memory to store data associated with a plurality of packet groups; and
  logic coupled to the memory, the logic configured to:
    receive a stream of packets from a network under test, two or more packets from the stream of packets containing a first packet group identification number (PGID) identifying a first packet group from the plurality of packet groups; and
    for each packet containing the first PGID:
      extract a sequence number (SN) from the received packet;
      retrieve data associated with the first packet group from the memory, the data including a next expected sequence number (NESN), a start of run (SOR), a number of in-order packets (NIO) and a number of duplicate packets (NDP);
      update the data, updating the data comprising:
        comparing SN to NESN,
        when SN is equal to NESN, incrementing NESN and incrementing NIO,
        when SN is less than NESN, comparing SN to SOR and, when SN is greater than or equal to SOR, incrementing NDP, and
        when SN is greater than NESN, setting SOR to SN, setting NESN to SN plus one, and incrementing NIO; and
      store the updated data in the memory.

6. The traffic receiver of claim 5, wherein
the data associated with the first packet group includes a number of lost packets (NLO), and
updating the data further comprising, when SN is greater than NESN:
  increasing NLO by a value equal to SN minus NESN.

7. The traffic receiver of claim 6, wherein
the data associated with the first packet group includes a number of reordered packets (NRO) and a number of late packets (NLA), and
updating the data associated with the first packet group further comprising, when SN is less than NESN and SN is less than SOR:
  comparing SN to NESN minus a predetermined late threshold (LT) to determine if SN is greater than or equal to NESN minus LT or less than NESN minus LT,
  when SN is greater than or equal to NESN minus LT, incrementing NRO and decrementing NLO, and
  when SN is less than NESN minus LT, incrementing NLA and decrementing NLO.

8. The traffic receiver of claim 7, wherein the data associated with the first packet group includes LT.

9. A computer-readable non-transitory storage medium storing data that, when used to program to one or more programmable devices, causes the one or more programmable devices to be configured as a traffic receiver comprising logic configured to:
  receive a stream of packets from a network under test, two or more packets from the stream of packets containing a first packet group identification number (PGID) identifying a first packet group from the plurality of packet groups; and
  for each packet containing the first PGID:
  extract a sequence number (SN) from the received packet;
  retrieve data associated with the first packet group from a memory, the data including a next expected sequence number (NESN), a start of run (SOR), a number of in-order packets (NIO) and a number of duplicate packets (NDP);

update the data, updating the data comprising:
  comparing SN to NESN,
    when SN is equal to NESN, incrementing NESN and incrementing NIO,
    when SN is less than NESN, comparing SN to SOR and, when SN is greater than or equal to SOR, incrementing NDP, and
    when SN is greater than NESN, setting SOR to SN, setting NESN to SN plus one, and incrementing NIO; and
  store the updated data in the memory.

10. The computer-readable non-transitory storage medium of claim 9, wherein
  the data associated with the first packet group includes a number of lost packets (NLO), and
  updating the data further comprising, when SN is greater than NESN:
    increasing NLO by a value equal to SN minus NESN.

11. The computer-readable non-transitory storage medium of claim 10, wherein
  the data associated with the first packet group includes a number of reordered packets (NRO) and a number of late packets (NLA), and
  updating the data further comprising, when SN is less than NESN and SN is less than SOR:
    comparing SN to NESN minus a predetermined late threshold (LT) to determine if SN is greater than or equal to NESN minus LT or less than NESN minus LT,
    when SN is greater than or equal to NESN minus LT, incrementing NRO and decrementing NLO, and
    when SN is less than NESN minus LT, incrementing NLA and decrementing NLO.

12. The computer-readable non-transitory storage medium of claim 11, wherein the data associated with the first packet group includes LT.

13. A method performed by a traffic receiver coupled to a network under test, comprising:
  receiving a stream of packets via the network under test, each packet a member of a packet group from a plurality of packet groups, each packet containing a packet group identification number (PGID) identifying the respective packet group and a sequence number (SN) defining a relative transmission order within the respective packet group, at least some of the plurality of packet groups including two or more packets; and
  for each received packet:
    extracting the PGID and the SN from the received packet;
    retrieving data associated with the packet group identified by the extracted PGID from memory within or coupled to the traffic receiver, the data including a next expected sequence number (NESN), a start of run (SOR), a number of in-order packets (NIO) and a number of duplicate packets (NDP);
    updating the data, updating the data comprising:
      comparing SN to NESN to determine if SN is equal to, less than, or greater than NESN,
      when SN is equal to NESN, incrementing NESN and incrementing NIO,
      when SN is less than NESN, comparing SN to SOR and, when SN is greater than or equal to SOR, incrementing NDP, and
      when SN is greater than NESN, setting SOR to SN, setting NESN to SN plus one, and incrementing NIO; and
    storing the updated data in the memory.

14. The method of claim 1, wherein the data associated with the packet group identified by the extracted PGID includes a number of lost packets (NLO), updating the data further comprising:
  when SN is greater than NESN, increasing NLO by a value equal to SN minus NESN.

15. The method of claim 2, wherein the data associated with the packet group identified by the extracted PGID includes a number of reordered packets (NRO) and a number of late packets (NLA), updating the data further comprising:
  when SN is less than NESN and SN is less than SOR:
    comparing SN to NESN minus a predetermined late threshold (LT),
    when SN is greater than or equal to NESN minus LT, incrementing NRO and decrementing NLO, and
    when SN is less than NESN minus LT, incrementing NLA and decrementing NLO.

16. The method of claim 3, wherein the data associated with the packet group identified by the extracted PGID includes LT.

* * * * *